Sept. 2, 1958     H. E. MILLS     2,849,891
SAFETY HANDLE
Filed Feb. 19, 1954
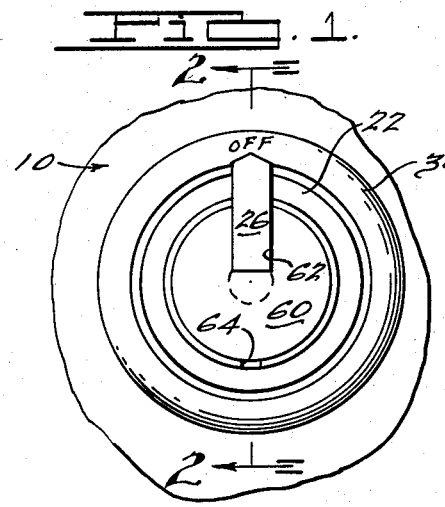
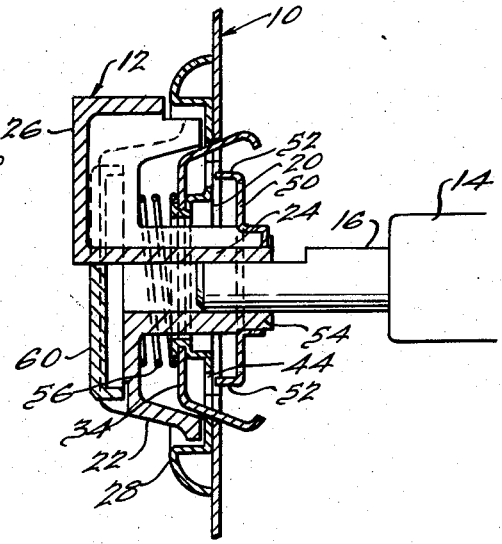
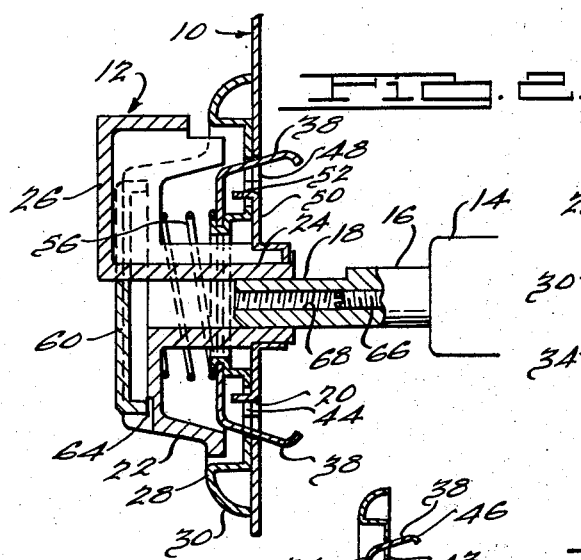
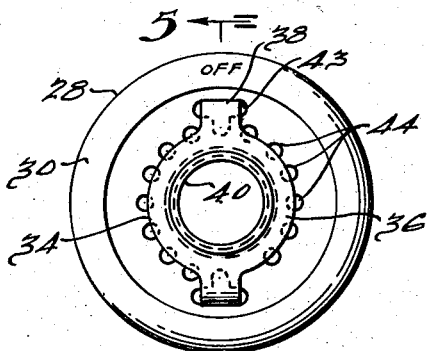
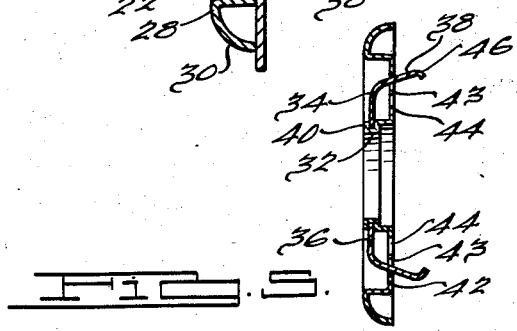
INVENTOR.
Herbert E. Mills
BY
ATTORNEY.

2,849,891

SAFETY HANDLE

Herbert E. Mills, Detroit, Mich.

Application February 19, 1954, Serial No. 411,351

2 Claims. (Cl. 74—504)

This invention relates to an operating handle for controls of various types and has particular reference to an operating handle for a gas stove or the like incorporating safety features. In general the invention comprises a handle member mounted on the operating stem of a control, such as a gas cock or the like and normally locked against rotation to reduce the possibility of the control being turned on accidentally. The handle is shifted axially inwardly to its unlocked position and may then be rotated to operate the control, and upon release the handle is automatically locked against rotation in any position to which it may have been turned.

A principal object of the invention, therefore, is to provide a new and improved safety handle for a control, such as a gas cock. A further object of the invention is to provide a novel and efficient safety handle construction.

Another object of the invention is to provide a safety handle for a gas stove or the like which is simple in construction and inexpensive to manufacture.

Other and further objects of the invention will be apparent from the following description and claims and may be understood by reference to the accompanying drawings, of which there is one sheet, which by way of illustration show a preferred embodiment of the invention and what I now consider to be the best mode in which I have contemplated applying the principles of my invention. Other embodiments of the invention may be used without departing from the scope of the present invention as set forth in the appended claims.

In the drawings:

Fig. 1 is a front elevational view of the handle;

Fig. 2 is a vertical sectional view of the handle taken on line 2—2 of Fig. 1 and showing the handle in its normally locked position;

Fig. 3 is a view similar to Fig. 2 but showing the handle in its unlocked position;

Fig. 4 is an elevational view of a part of the locking mechanism of the handle; and Fig. 5 is a sectional view of the locking mechanism shown in Fig. 4 and taken on line 5—5 of Fig. 4.

In the drawings the numeral 10 indicates a panel which may be the outer panel of a gas stove or the like, and the safety handle indicated generally at 12 is adapted to operate a control, such as the gas cock 14. The control 14 includes a rotatable operating stem 16 having a flat 18 at its outer end projecting toward or through an opening 20 in the panel 10.

The handle 12 comprises a body member 22 having a centrally disposed hub or sleeve 24, the inner periphery of which is shaped to receive the outer end of the operating stem 16. The handle 12 is axially slidable on the stem 16, but is non-rotatable on the stem because of the flat 18 provided on the outer end of the stem and a corresponding flat formed on the sleeve 24. The handle 12 is provided with an integral raised portion 26 providing an indicator or arrow for indicating the operative position of the handle and the control operated thereby.

An annular ring 28 having a beaded edge 30 is seated against the outer side of the panel 10 around the opening 20 in the panel, and the ring 28 has a central opening 32 through which the sleeve portion 24 of the handle 12 projects. A spring member 34, comprising an annular flat ring portion 36 and diametrically opposed inwardly bent arms 38, is mounted on the ring 28 as shown in Fig. 5, and the outer end of the flange 40 of the ring is then staked over at spaced points to secure the spring member 34 to the ring 28. The base 42 of the ring 28 is provided with two diametrically opposed slots 43 through which the inwardly bent arms 38 of the spring 34 project, the arms 38 being disposed in diverging relation as shown, and having their outer ends bent inwardly as at 46. The ring assembly is detachably secured ot the panel 10 by compressing the diverging spring arms 38 to an extent sufficient to permit them to pass through keyhole slots 48 intersecting the opening 20 in the panel 10, and upon release of the spring the arms 38 thereof will frictionally retain the ring assembly in position against the panel 10. The diametrically opposed slots 48 are similar to and aligned with the slots 43 in the ring 28, the engagement of arms 38 of spring 34 with the keyhole slots 48 in the panel preventing rotation of the ring 28 relative to the panel 10. The ring 28 has a series of apertures 44 therein arranged in a circle and accessible from the inner side of the panel through opening 20.

A locking member 50 in the form of a disk having diametrically opposed axial projections 52 is suitably secured on the inner end 54 of the sleeve 24, and when the handle 12 is in the normally locked position shown in Fig. 2, the projections 52 project through two of the apertures 44 provided on the ring 28 to prevent rotation of the handle and operating stem 16. A spring 56 is confined between the handle and the disk portion 36 of the spring 34 and biases the handle 12 to its normally locked position.

Depression of the handle 12 from its normally locked position will result in shifting of the handle axially inwardly along the stem 16, thereby moving the projections 52 on the locking member 50 from the apertures 44 in the ring 28 and unlocking the handle so that the handle and operating stem 16 may be turned to the desired position. Subsequent release of the handle when in the Fig. 3 position will result in axial shifting of the handle along the stem back to the Fig. 2 position, and the locking projections 52 will pass through whichever of the apertures 44 are most closely aligned therewith, and the handle is thus automatically locked against operation thereof, unless the handle is first depressed to unlock the same. The ends of the locking projections 52 may be rounded off, and the material surrounding the apertures 44 in the ring may be suitably deformed if necessary in order to permit the projections to readily enter the apertures upon release of the handle after it has been turned to the desired position.

The outer end wall of the body member 22 is adapted to be closed by a cap 60 having a cutout 62 adapted to fit around the indicating portion 26 of the handle. The purpose of such construction is to permit removal of the cap 60 as by inserting a suitable tool beneath the lower edge of the cap through a slot 64 provided on the handle 12, thus exposing the outer end of the stem 16 without the necessity of removing or otherwise disassembling the handle structure. The operating stems of gas cocks are frequently provided with an adjusting plug 66 threaded into a tapped bore 68 so that the plug 66 may be accessible for adjustment thereof to vary or regulate the discharge of the gas valve, and removal of cap 60 from the handle body 22 permits access to the adjusting plug 66 without disassembly or removal of the handle.

It will be seen that the present invention provides a relatively simple but efficient handle construction embodying safety features to prevent accidental operation thereof, especially by small children, and further that the device is capable of being used to control devices other than gas cocks as described herein, it being necessary only that the device to be controlled have a rotatable operating stem to which the handle may be applied.

While I have illustrated and described a preferred embodiment of my invention, it is understood that this is capable of modification and I therefore do not wish to be limited to the precise details set forth but desire to avail myself of such changes and alterations as fall within the purview of the following claims.

I claim:

1. In combination with a panel having an opening therein and a rotatable control operating stem aligned with the panel opening, a ring seated against one side of said panel around the opening therein, said ring having a circular series of apertures therein accessible through the panel opening, a body member slidably and non-rotatably mounted on said stem and including a handle portion disposed on said one side of said panel outwardly of said ring, a locking member secured on said body member and disposed on the other side of said panel so as to be receivable in any one of said apertures by movement of said body member away from said ring and panel for locking said body member against rotation in any rotative position thereof, spring means urging said body member into said locking position, and a spring member secured to said ring and projecting through and resiliently engaging the other side of said panel at spaced points for detachably securing said ring to said panel.

2. Handle structure for a rotatable control operating stem disposed inwardly of a panel having an opening therein and aligned with the panel opening; a body member having a sleeve portion slidably and non-rotatably mounted on the outer end of said stem and a handle portion disposed outwardly of the panel, a ring mounted on the outer side of said panel around the opening therein and between said handle portion and said panel, said sleeve portion extending through said ring, said ring having a series of apertures therein disposed radially inwardly from the edge defining the panel opening, a locking member secured on said sleeve portion and disposed on the inner side of said panel and receivable in any one of said apertures by movement toward the inner side of said panel for locking said body member and stem against rotation in any rotative position thereof, and spring means urging said body member outwardly along said operating stem and away from said panel into said locking position, said body member being slidable inwardly on said stem toward said ring to disengage said locking member from said ring and permit rotative adjustment of said operating stem.

References Cited in the file of this patent

UNITED STATES PATENTS

| | | |
|---|---|---|
| 1,121,750 | Miller | Dec. 22, 1914 |
| 1,928,381 | Kahn et al. | Sept. 26, 1933 |
| 2,292,717 | Rubinstein | Aug. 11, 1942 |
| 2,502,915 | Arkins et al. | Apr. 4, 1950 |
| 2,687,275 | Huff | Aug. 24, 1954 |